(12) United States Patent
Magnezi et al.

(10) Patent No.: US 11,962,643 B2
(45) Date of Patent: Apr. 16, 2024

(54) IMPLEMENTING MULTIPLE LOAD BALANCER DRIVERS FOR A SINGLE LOAD BALANCER

(71) Applicant: Red Hat Israel, Ltd., Raanana (IL)

(72) Inventors: Nir Magnezi, Raanana (IL); Arie Bregman, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 1092 days.

(21) Appl. No.: 16/272,682

(22) Filed: Feb. 11, 2019

(65) Prior Publication Data

US 2020/0259892 A1    Aug. 13, 2020

(51) Int. Cl.
| | |
|---|---|
| H04L 67/1008 | (2022.01) |
| H04L 67/1012 | (2022.01) |
| H04L 67/563 | (2022.01) |
| H04L 67/63 | (2022.01) |

(52) U.S. Cl.
CPC ...... *H04L 67/1008* (2013.01); *H04L 67/1012* (2013.01); *H04L 67/563* (2022.05); *H04L 67/63* (2022.05)

(58) Field of Classification Search
CPC ............. H04L 67/1008; H04L 67/1012; H04L 67/2814; H04L 67/327
USPC ...................................................... 709/201
See application file for complete search history.

(56) References Cited

U.S. PATENT DOCUMENTS

| | | | |
|---|---|---|---|
| 9,483,473 B2 | 11/2016 | Ansel et al. | |
| 9,705,977 B2 | 7/2017 | Porter | |
| 2012/0179742 A1* | 7/2012 | Acharya | G08G 1/0175 709/202 |
| 2012/0271964 A1* | 10/2012 | Porter | H04L 67/1008 709/235 |
| 2015/0081773 A1* | 3/2015 | Ansel | G06F 16/958 709/203 |

FOREIGN PATENT DOCUMENTS

CN        104579996 A     4/2015

OTHER PUBLICATIONS

Anicas, Mitchell, "An Introduction to HAProxy and Load Balancing Concepts," www.digitalocean.com/community/tutorials/an-introduction-to-haproxy-and-load-balancing-concepts, Digital Ocean, May 13, 2014, 13 pages.
(Continued)

*Primary Examiner* — Vivek V Srivastava
*Assistant Examiner* — Hien V Doan
(74) *Attorney, Agent, or Firm* — Dority & Manning, P.A.

(57) ABSTRACT

Implementing multiple load balancer drivers for a single load balancer is disclosed. A first request directed to a load balancer to load balance requests based on a first request selection instruction is received. A first particular load balancer driver is selected from a plurality of load balancer drivers based on a load balancer table that correlates request selection instructions to corresponding load balancer drivers of the plurality of load balancer drivers. Subsequent requests that are encompassed by the first request selection instruction directed to the load balancer are caused to be load balanced by the first particular load balancer driver.

20 Claims, 7 Drawing Sheets

(56) References Cited

OTHER PUBLICATIONS

Eisenbud, Daniel, et al., "Maglev: A Fast and Reliable Software Network Load Balancer," Symposium on Networked Systems Design and Implementation, Santa Clara, California, 2016, USENIX, 13 pages.
Klein, Matt, "Introduction to modern network load balancing and proxying, " blog.envoyproxy.io/introduction-to-modern-network-load-balancing-and-proxying-a57f6ff80236, Dec. 28, 2017, 24 pages.
Peck, Nathan, "Using AWS Application Load Balancer and Network Load Balancer with EC2 Container Service," medium.com/containers-on-aws/using-aws-application-load-balancer-and-network-load-balancer-with-ec2-container-service-d0cb0b1d5ae5, Oct. 25, 2017, 18 pages.

* cited by examiner

IMPLEMENTING MULTIPLE LOAD BALANCER DRIVERS FOR A SINGLE LOAD BALANCER

BACKGROUND

Load balancers typically load balance traffic based on a single criterion, such as load balancing based on a particular protocol, or load balancing based on a particular open systems interconnection (OSI) layer. Not all load balancers load balance equally for the same criterion, and some may be better at load balancing based on one criterion than another. For example, a first load balancer may excel at layer 7 load balancing, and a second load balancer may excel at layer 4 load balancing.

SUMMARY

The examples disclosed herein implement a load balancer that can implement multiple concurrent load balancer drivers, each of which can load balance selected traffic based on a different criterion. For example, traffic having one characteristic may be load balanced based on layer 7 content, and traffic having another characteristic may be load balanced based on layer 4 content. The examples, in some implementations, provide load balancing in a cloud computing environment, and eliminate a need to implement multiple different load balancers in order to load balance different traffic via different load balancing mechanisms.

In one example a method is provided. The method includes receiving a first request directed to a load balancer to load balance requests based on a first request selection instruction. The method further includes selecting a first particular load balancer driver from a plurality of load balancer drivers based on a load balancer table that correlates request selection instructions to corresponding load balancer drivers of the plurality of load balancer drivers. The method further includes causing subsequent requests that are encompassed by the first request selection instruction directed to the load balancer to be load balanced by the first particular load balancer driver.

In another example a system is provided. The system includes one or more computing devices, each computing device comprising a memory and a processor device coupled to the memory. The one or more computing devices are to receive a first request directed to a load balancer to load balance requests based on a first request selection instruction. The one or more computing devices are further to select a first particular load balancer driver from a plurality of load balancer drivers based on a load balancer table that correlates request selection instructions to corresponding load balancer drivers of the plurality of load balancer drivers. The one or more computing devices are further to cause subsequent requests that are encompassed by the first request selection instruction directed to the load balancer to be load balanced by the first particular load balancer driver.

In another example a computer program product is provided. The computer program product is stored on a non-transitory computer-readable storage medium and includes instructions configured to cause one or more processor devices to receive a first request directed to a load balancer to load balance requests based on a first request selection instruction. The instructions further cause the one or more processor devices to select a first particular load balancer driver from a plurality of load balancer drivers based on a load balancer table that correlates request selection instructions to corresponding load balancer drivers of the plurality of load balancer drivers. The instructions further cause the one or more processor devices to cause subsequent requests that are encompassed by the first request selection instruction directed to the load balancer to be load balanced by the first particular load balancer driver.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Load balancers typically load balance traffic based on a single criterion, such as load balancing based on a particular protocol, or load balancing based on a particular open systems interconnection (OSI) layer. Not all load balancers load balance equally for the same criterion, and some may be better at load balancing based on one criterion than another. For example, a first load balancer may excel at layer 7 load balancing, and a second load balancer may excel at layer 4 load balancing.

The examples disclosed herein implement a load balancer that can implement multiple concurrent load balancer drivers, each of which can load balance selected traffic based on a different criterion. For example, traffic having one characteristic may be load balanced based on layer 7 content, and traffic having another characteristic may be load balanced based on layer 4 content. The examples, in some implementations, provide load balancing in a cloud computing environment, and eliminate a need to implement multiple different load balancers in order to load balance different traffic via different load balancing mechanisms. In particular, a first request can be directed to a load balancer to balance requests based on a first request selection instruction. In response, based on a load balancer table that correlates request selection instructions to corresponding load balancer drivers, a first load balancer driver can be selected to load balance requests that are encompassed by the first request selection instruction. A second request can be directed to the same load balancer to balance requests based on a second request selection instruction. In response, based on the load balancer table, a second load balancer driver can be selected to load balance requests that are encompassed by the second request selection instruction concurrently while the requests encompassed by the first request selection instruction directed to the load balancer are load balanced by the first load balancer driver.

Figure 1A:
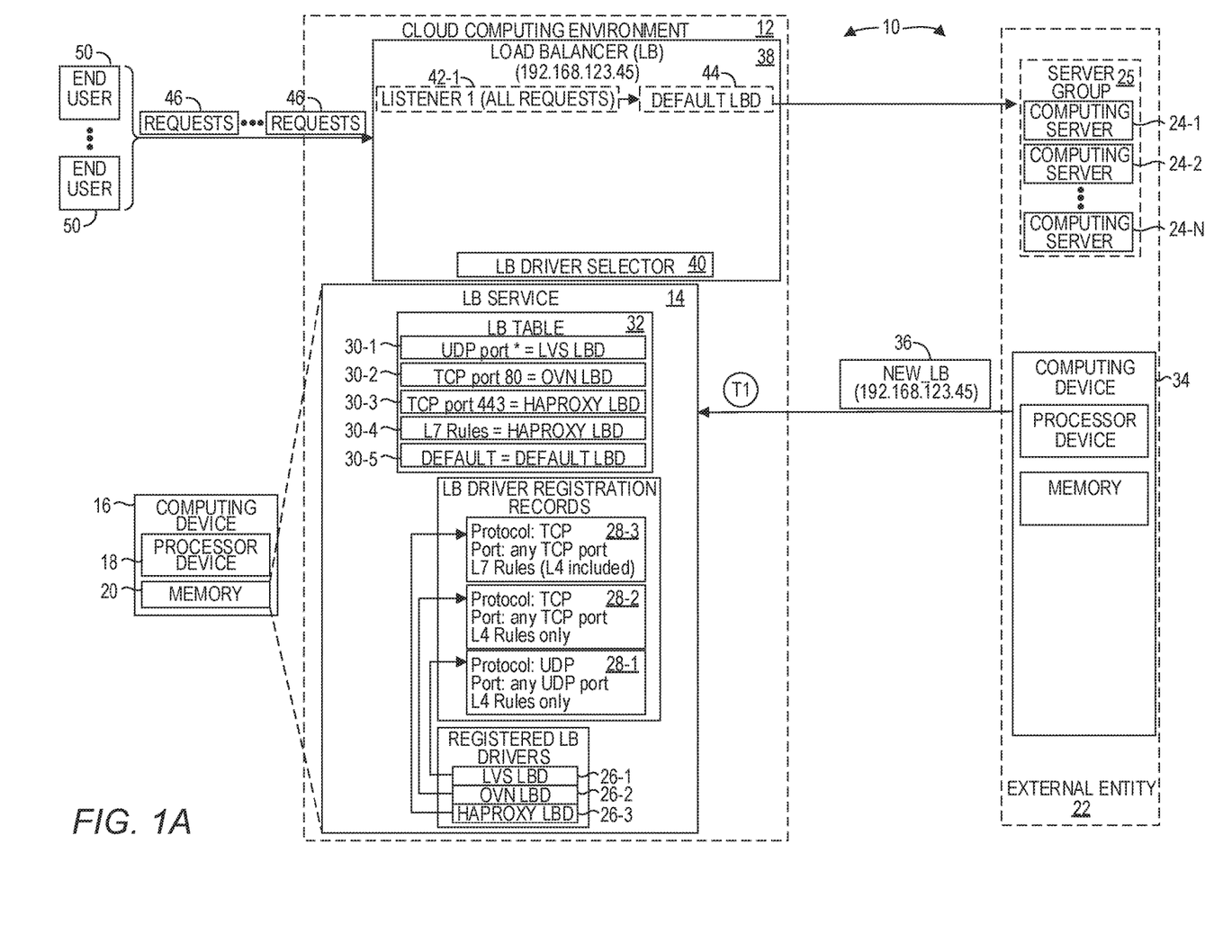
FIG. 1A is a block diagram of an environment in which examples disclosed herein may be implemented.

FIG. 1A is a block diagram of an environment 10 in which examples disclosed herein may be implemented. The environment 10 includes a cloud computing environment 12. The cloud computing environment 12 includes a load balancer (LB) service 14 configured to facilitate load balancing services for external entities, such as an external entity 22, that utilize the cloud computing environment 12. The LB service 14 may, in some examples, execute on a computing device 16 which includes a processor device 18 and a memory 20. The phrase "cloud computing environment" as used herein, refers to a computing environment, often provided by a service provider, which facilitates dynamic and scalable computing resources as needed. A cloud computing environment often utilizes multiple computing devices to implement tasks as needed. Examples of cloud computing environments include Amazon AWS and Microsoft Azure. It should be noted that, while for purposes of illustration the examples are disclosed in the context of a cloud computing environment, the examples disclosed herein are not limited to a cloud computing environment and have applicability to any environment in which load balancing is utilized.

The external entity 22, such as, by way of non-limiting example, an online store, sells products to end users 50 via the cloud computing environment 12. As will be discussed in greater detail with regard to FIG. 1B, end user computers may request information, such as a web page of the external entity 22, that is stored on one or more of a plurality of computing servers 24-1—1 24-N (generally, computing servers 24) of a server group 25. The external entity 22 may desire that such requests first be received by a load balancer that executes in the cloud computing environment 12, and which implements some algorithm, such as a round robin algorithm, for spreading requests out among the various computing servers 24.

The LB service 14 includes a plurality of registered LB drivers 26-1—26-3 (generally, LB drivers 26). Instances of the LB drivers 26 can be initiated in the cloud computing environment 12 in conjunction with a load balancer, and are the applications that actually perform the load balancing of requests based on one or more criteria. As a new LB driver 26 becomes available, the LB driver 26 registers with the LB service 14 and provides selection information to the LB service 14 that identifies LB capabilities of the respective LB driver 26. As a first example, the Linux Virtual Server (LVS) LB driver 26-1 ("LVS LBD") registers with the LB service 14 and, as part of the registration process, provides a LB registration record 28-1 that identifies the LB capabilities of the respective LVS LB driver 26-1. In this example, the LB registration record 28-1 indicates that the LVS LB driver 26-1 can load balance traffic that utilizes the User Datagram Protocol (UDP protocol), can access any port that utilizes the UDP protocol, and utilizes open systems interconnection (OSI) layer four (L4) rules only. In some implementations, the LB drivers 26 may be implemented via a plug-in technology, such that, for example, the registration process may include the LB service 14 querying each LB driver 26 via a plug-in interface to determine the capabilities of the LB drivers 26.

As a second example, the Open Virtual Network (OVN) LB driver 26-2 ("OVN LBD") registers with the LB service 14 and, as part of the registration process, provides selection information in the form of a LB registration record 28-2 that identifies the LB capabilities of the respective OVN LB driver 26-2. In this example, the LB registration record 28-2 indicates that the OVN LB driver 26-2 can load balance traffic that utilizes the TCP protocol, can access any port that utilizes the Transmission Control Protocol (TCP) protocol, and utilizes layer four (L4) rules only.

As a third example, the HAProxy LB driver 26-3 ("HAPROXY LBD") registers with the LB service 14 and, as part of the registration process, provides selection information in the form of a LB registration record 28-3 that identifies the LB capabilities of the respective HAProxy LB driver 26-3. In this example, the LB registration record 28-3 indicates that the HAProxy LB driver 26-3 can load balance traffic that utilizes the TCP protocol, can access any port that utilizes the TCP protocol, and utilizes layer seven (L7) rules or layer four rules.

After receiving the LB registration record 28-1, the LB service 14 generates a table entry 30-1 that correlates subsequent request selection instructions that may be received from an entity that desires load balancing services to the load balancing capability of the LVS LB driver 26-1, and stores such table entry 30-1 in a LB table 32. In this example, the LB service 14 correlates request selection instructions that instruct a LB to load balance requests that arrive on a UDP port with the LVS LB driver 26-1. After receiving the LB registration record 28-2, the LB service 14 generates a table entry 30-2 that correlates subsequent request selection instructions that may be received from an entity that desires load balancing services to the load balancing capability of the OVN LB driver 26-2, and stores such table entry 30-2 in the LB table 32. In this example, the LB service 14 correlates request selection instructions that instruct a LB to load balance requests that arrive on port 80 with the OVN LB driver 26-2.

After receiving the LB registration record 28-3, the LB service 14 generates a table entry 30-3 that correlates subsequent request selection instructions that may be received from an entity that desires load balancing services to the load balancing capability of the HAProxy LB driver 26-3, and stores such table entry 30-3 in the LB table 32. In this example, the LB service 14 correlates request selection instructions that instruct a LB to load balance requests that arrive on port 443 with the HAProxy LB driver 26-3. Because the HAProxy LB driver 26-3 is also capable of implementing L7 load balancing, the LB service 14 generates a table entry 30-4 that correlates request selection instructions that instruct a LB to load balance requests based on L7 rules with the HAProxy LB driver 26-3, and stores the table entry 30-4 in the LB table 32. The LB service 14 may also generate a table entry 30-5 that will identify a default LB to be used as a default, such as when the LB service 14 receives no specific request selection instructions for a LB, or when the LB service 14 receives request selection instructions that are not understood by the LB service 14.

Assume that at a time T1, a computing device 34 associated with the external entity 22 sends a request 36 to the LB service 14 requesting that the LB service 14 establish a load balancer for the IP address 192.168.123.45. In response, the LB service 14 initiates a LB 38. The LB 38 may execute on the computing device 16 or on another computing device in the cloud computing environment 12. The LB 38 initiates a LB driver selector 40, which will be described in greater detail below. The LB 38 represents a destination for any requests addressed to IP address 192.168.123.45, which may, to end user computers, be associated with the online store of the external entity 22. In some examples, in the absence of immediate specific request selection instructions, the LB driver selector 40 may access the LB table 32 and select the default LB driver, in this case, the HAProxy LB driver 26-3, and cause any subsequently received requests directed to the LB 38 to be load balanced by an instance of the HAProxy LB driver 26-3. Specifically, the LB driver selector 40 may initiate a listener 42-1 and a HAProxy LBD 44 instance. The listener 42-1 is notified upon the arrival of any requests 46 from the end users 50 that are directed to the LB 38, and upon notification sends the requests 46 to the HAProxy LBD 44 for load balancing.

Figure 1B:
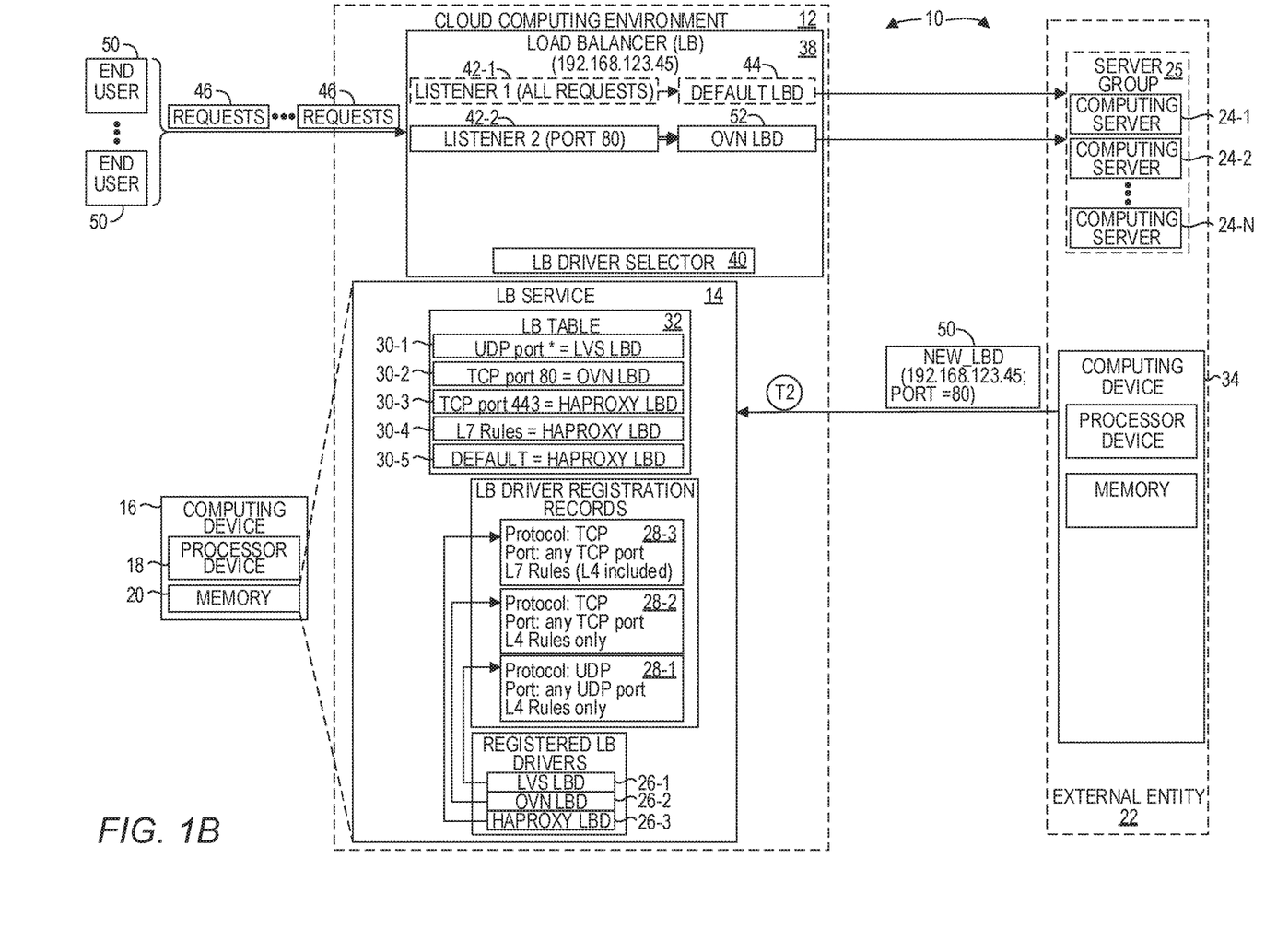
FIGS. 1B-1D are block diagrams of the environment illustrated in FIG. 1A at subsequent points in time.

Referring now to FIG. 1B, which depicts the environment 10 illustrated in FIG. 1A at a subsequent point in time T2, assume that the computing device 34 sends a request 50 to the LB driver selector 40 that includes a request selection instruction that identifies certain requests that may be subsequently received by the LB 38 and indicates that such certain requests should be load balanced among the computing servers 24. The LB driver selector 40 receives the request 50, either directly or via the LB service 14, and selects a particular LB driver 26 from the plurality of LB drivers 26 based on the LB table 32 that correlates request selection instructions to corresponding LB drivers 26. In this case, the LB driver selector 40 determines that the request selection instruction in the request 50 identifies those requests 46 that will be directed to port 80 of the LB 38 (i.e., to 192.168.123.45:80). The LB driver selector 40 accesses the LB table 32 and determines that the table entry 30-2 correlates request selection instructions that identify requests 46 sent to port 80 with the OVN LB driver 26-2. The LB driver selector 40 may then initiate a listener 42-2 and an OVN LBD 52 instance. The listener 42-2 is now also notified upon the arrival of a request 46 to the LB 38, and upon notification sends any requests 46 directed to port 80 to the OVN LBD 52 for load balancing. Any other requests 46 will be sent by the listener 42-1 to the HAProxy LB driver 44 for load balancing.

Figure 1C:
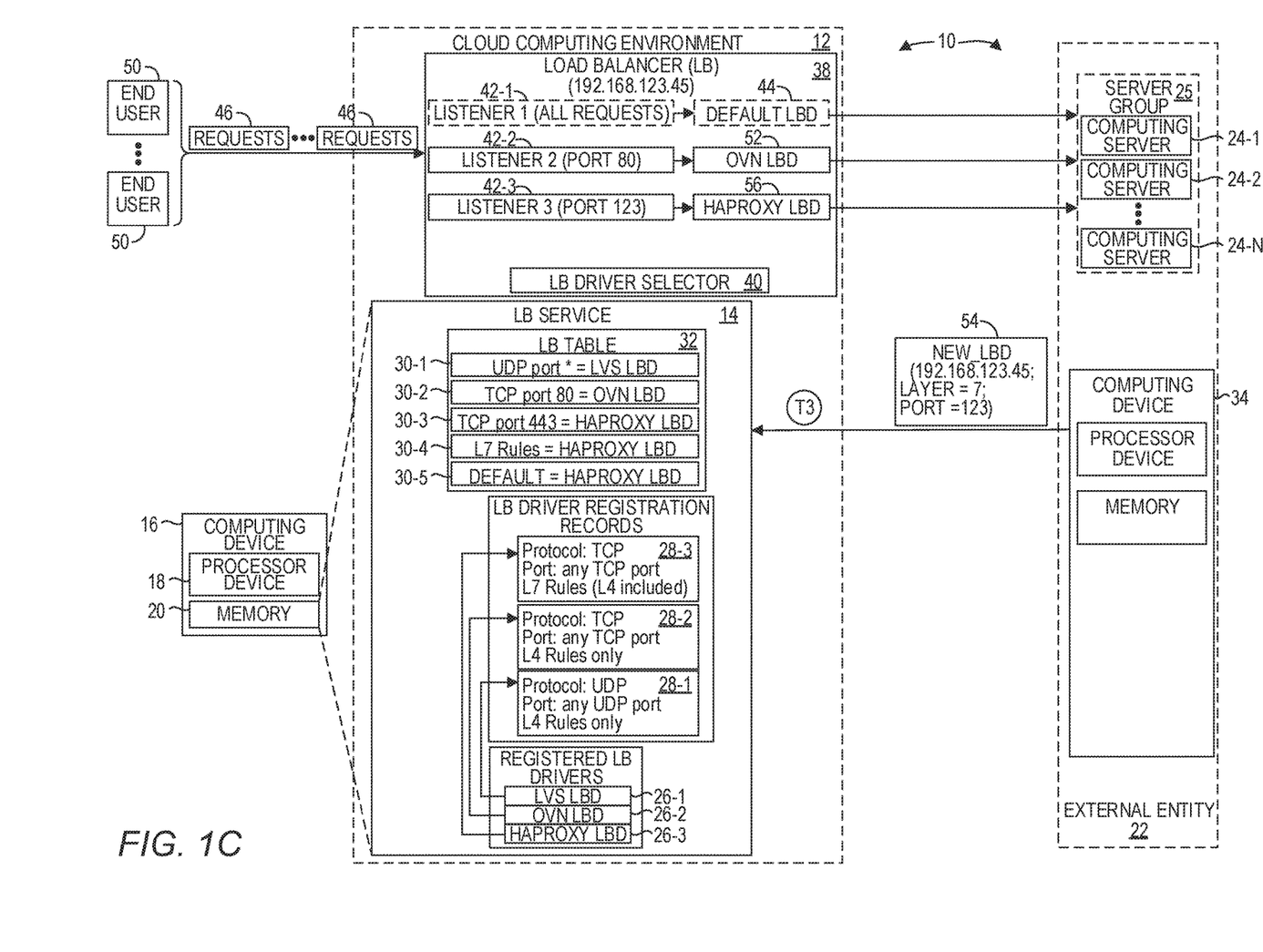

Referring now to FIG. 1C, which depicts the environment 10 illustrated in FIG. 1B at a subsequent point in time T3, assume that the computing device 34 sends a request 54 to the LB driver selector 40 that includes a request selection instruction that identifies certain requests that may be subsequently received by the LB 38 and indicates that such certain requests should be load balanced among the computing servers 24. The LB driver selector 40 receives the request 54, either directly or via the LB service 14, and selects a particular LB driver 26 from the plurality of LB drivers 26 based on the LB table 32 that correlates request selection instructions to corresponding LB drivers 26. In this case, the LB driver selector 40 determines that the request selection instruction in the request 54 identifies those requests 46 that will be directed to port 123 of the LB 38 (i.e., to 192.168.123.45:123), and the request selection instruction indicates that all such requests 46 should be load balanced based on the content of layer 7 of such requests 46. The LB driver selector 40 accesses the LB table 32 and determines that the table entry 30-4 correlates request selection instructions that identify requests 46 that should be load balanced based on layer 7 with the LB driver 26-3. The LB driver selector 40 may then initiate a listener 42-3 and a HAProxy LBD 56 instance. The listener 42-3 is now also notified upon the arrival of a request 46 to the LB 38, and upon notification sends any requests 46 directed to port 123 to the HAProxy LBD 56 for load balancing.

Figure 1D:
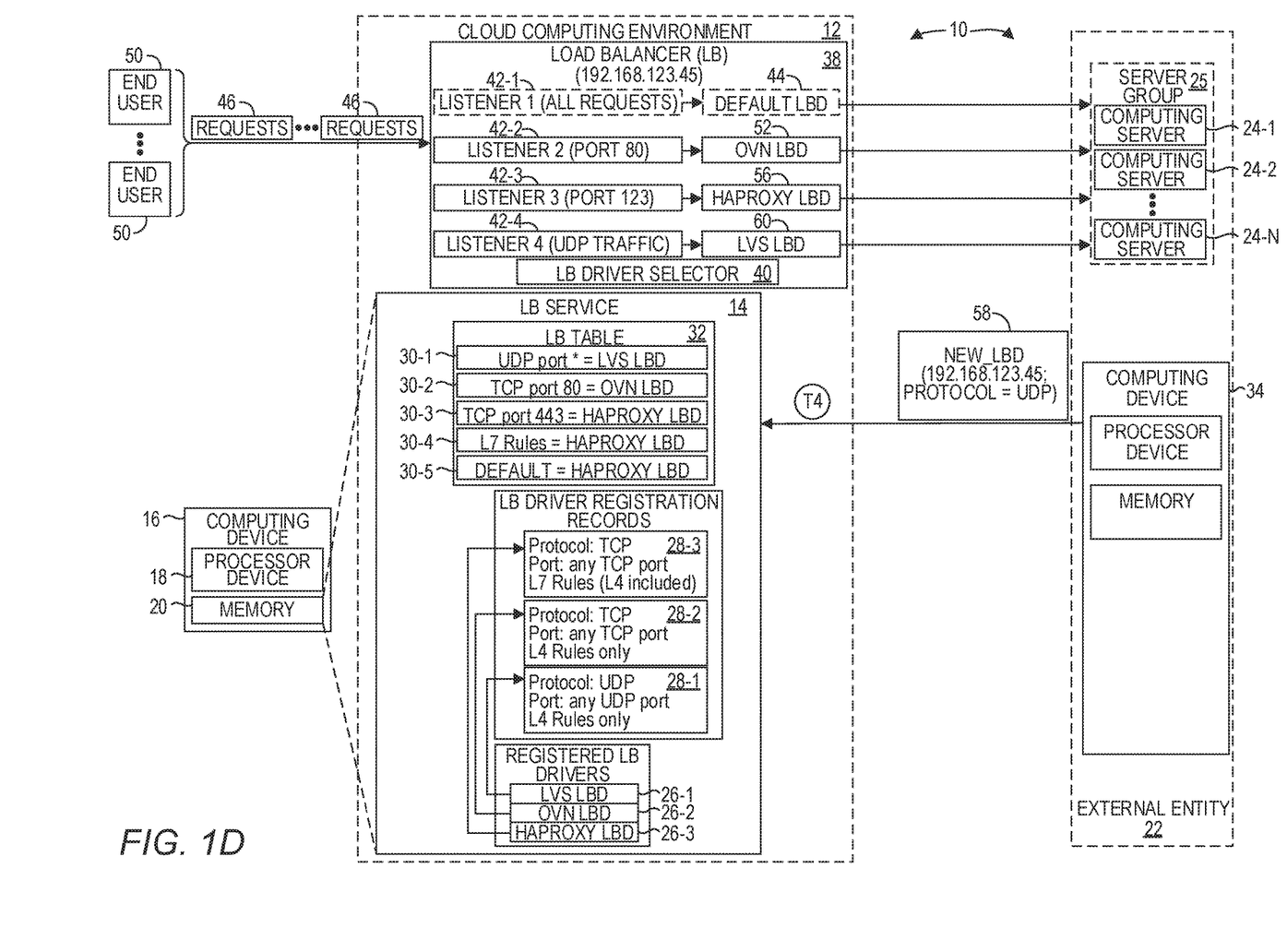

Referring now to FIG. 1D, which depicts the environment 10 illustrated in FIG. 1C at a subsequent point in time T4, assume that the computing device 34 sends a request 58 to the LB driver selector 40 that includes a request selection instruction that identifies certain requests that may be subsequently received by the LB 38 and indicates that such certain requests should be load balanced among the computing servers 24. The LB driver selector 40 receives the request 58, either directly or via the LB service 14, and selects a particular LB driver 26 from the plurality of LB drivers 26 based on the LB table 32 that correlates request selection instructions to corresponding LB drivers 26. In this case, the LB driver selector 40 determines that the request selection instruction in the request 58 identifies those requests 46 that utilize the UDP protocol. The LB driver selector 40 accesses the LB table 32 and determines that the table entry 30-1 correlates request selection instructions that identify requests 46 that should be load balanced based on the use of the UDP protocol with the LVS LB driver 26-1. The LB driver selector 40 may then initiate a listener 42-4 and a LVS LBD 60 instance. The listener 42-4 is now also notified upon the arrival of a request 46 to the LB 38, and upon notification sends any requests 46 that utilize the UDP protocol to the LVS LBD 60 for load balancing.

While for purposes of simplicity each of the LBDs 44, 52, 56 and 60 are illustrated as load balancing requests 46 among the same computing servers 24, it will be appreciated that the LBDs 44, 52, 56 and 60 may load balance the specific requests 46 among different sets of computing servers 24.

Figure 2:
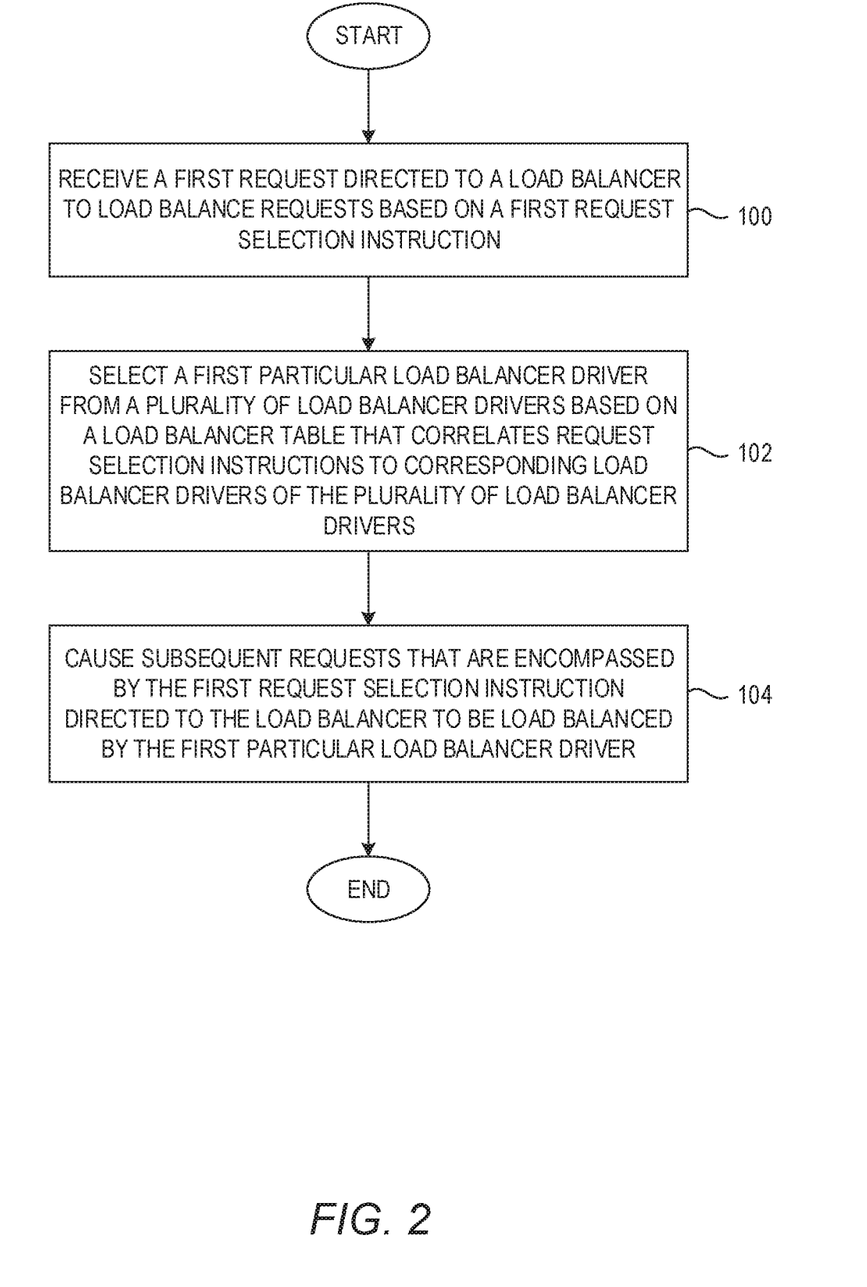
FIG. 2 is a flowchart of a method for implementing a load balancer driver in conjunction with a load balancer according to one example.

FIG. 2 is a flowchart of a method for implementing a load balancer driver in conjunction with a load balancer according to one example. FIG. 2 will be discussed in conjunction with FIGS. 1A-1D. The LB driver selector 40 receives the request 36 (FIG. 1B) directed to the load balancer 38 to load balance requests 50 based on a first request selection instruction (FIG. 2, block 100). The LB driver selector 40 selects the particular OVN LB driver 26-2 from the plurality of load balancer drivers 26 based on the LB table 32 that correlates request selection instructions to corresponding LB drivers 26 of the plurality of LB drivers 26 (FIG. 2, block 102). The LB driver selector 40 causes subsequent requests 46 that are encompassed by the first request selection instruction directed to the load balancer 38 to be load balanced by the first particular OVN LB driver 26-2 (FIG. 2, block 104).

Figure 3:
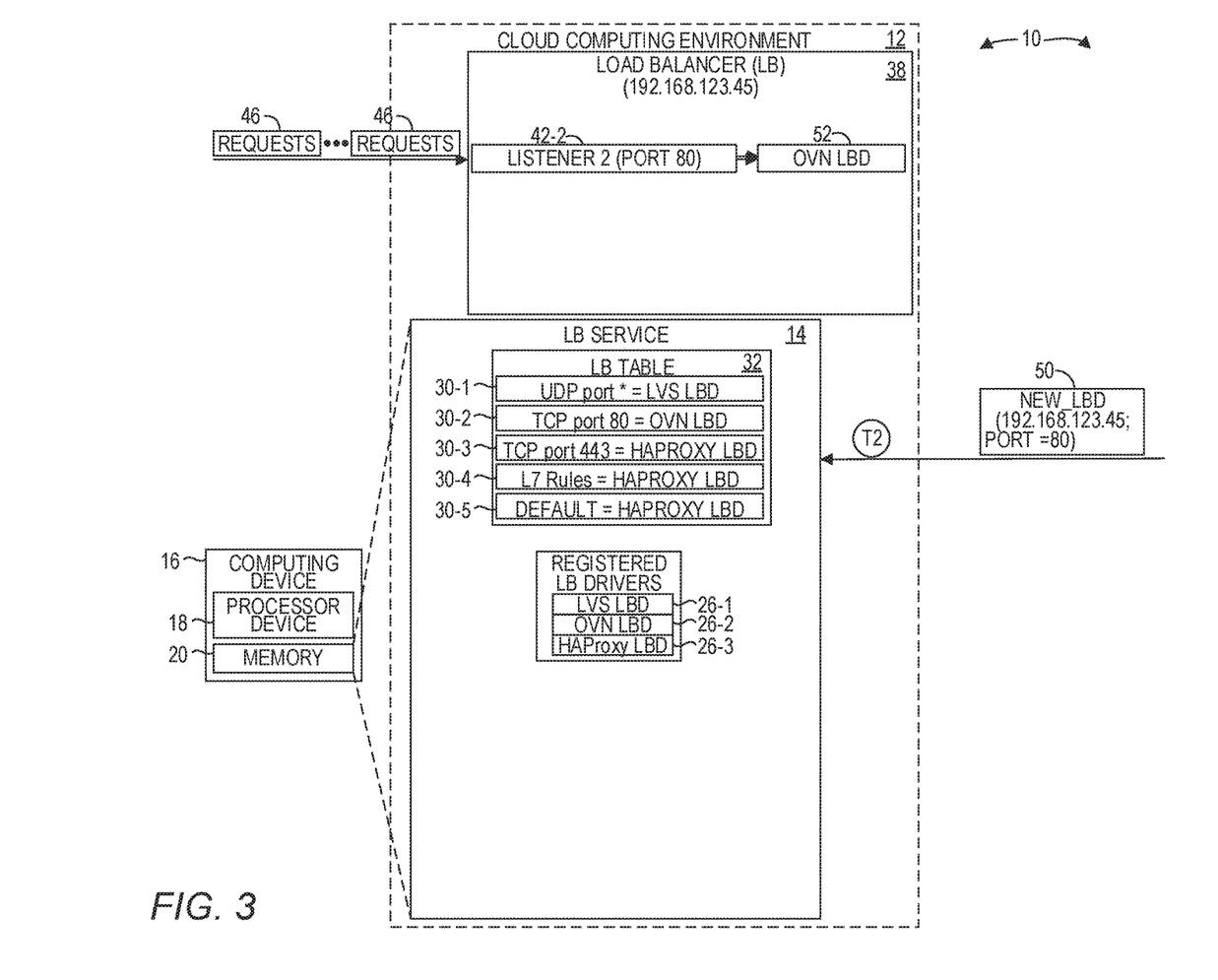
FIG. 3 is a simplified block diagram of FIG. 1B according to one example.

FIG. 3 is a simplified block diagram of FIG. 1B according to one example. The environment 10 includes a system that comprises one or more computing devices, such as the computing device 16, each computing device comprising a memory and a processor device coupled to the memory. The one or more computing devices are to receive the request 50 to load balance requests 46 based on a first request selection instruction and that are directed to the particular load balancer 38. The one or more computing devices are further to select the first particular OVN LB driver 26-2 from the plurality of load balancer drivers 26 based on the LB table 32 that correlates request selection instructions to corresponding load balancer drivers 26 of the plurality of load balancer drivers 26. The one or more computing devices are to cause subsequent requests 46 that are encompassed by the first request selection instruction directed to the load balancer 38 to be load balanced by the first particular OVN LB driver 26-2.

Figure 4:
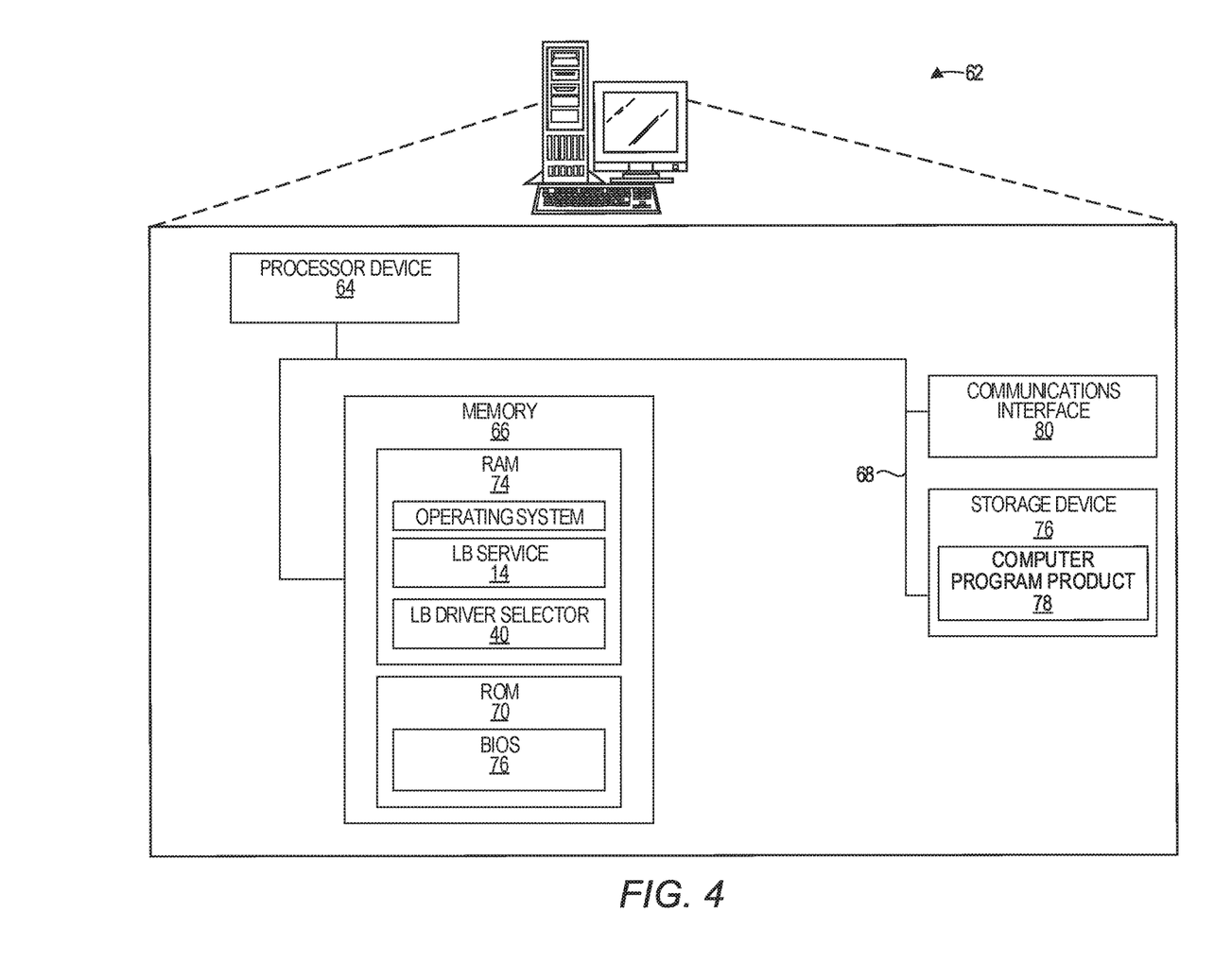
FIG. 4 is a block diagram of a computing device suitable for implementing any of the functions disclosed herein.

FIG. 4 is a block diagram of a computing device 62 suitable for implementing any of the functions disclosed herein, including, for example, the functionality of the LB service 14 and the LB driver selector 40. The computing device 62 may comprise any computing or electronic device capable of including firmware, hardware, and/or executing software instructions to implement the functionality described herein, such as a computer server, a desktop computing device, a laptop computing device or the like. The computing device 62 includes a processor device 64, a system memory 66, and a system bus 68. The system bus 68 provides an interface for system components including, but not limited to, the system memory 66 and the processor device 64. The processor device 64 can be any commercially available or proprietary processor.

The system bus 68 may be any of several types of bus structures that may further interconnect to a memory bus (with or without a memory controller), a peripheral bus, and/or a local bus using any of a variety of commercially available bus architectures. The system memory 66 may include non-volatile memory 70 (e.g., read-only memory (ROM), erasable programmable read-only memory (EPROM), electrically erasable programmable read-only memory (EEPROM), etc.), and volatile memory 74 (e.g., random-access memory (RAM)). A basic input/output system (BIOS) 76 may be stored in the non-volatile memory 70 and can include the basic routines that help to transfer information between elements within the computing device 62. The volatile memory 74 may also include a high-speed RAM, such as static RAM, for caching data.

The computing device 62 may further include or be coupled to a non-transitory computer-readable storage medium such as a storage device 76, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 76 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 76 and in the volatile memory 74, including an operating system and one or more program modules, such as the LB service 14 and/or the LB driver selector 40, which may implement the functionality described herein in whole or in part.

Because the LB service 14 is a component of the computing device 62, functionality implemented by the LB service 14 may be attributed to the computing device 62 generally. Moreover, in examples where the LB service 14 comprises software instructions that program the processor device 64 to carry out functionality discussed herein, functionality implemented by the LB service 14 may be attributed herein to the processor device 64. Similarly, because the LB driver selector 40 is a component of the computing device 62, functionality implemented by the LB driver selector 40 may be attributed to the computing device 62 generally. Moreover, in examples where the LB driver selector 40 comprises software instructions that program the processor device 64 to carry out functionality discussed herein, functionality implemented by the LB driver selector 40 may be attributed herein to the processor device 64. It will be appreciated that the LB service 14 and the LB driver selector 40 may be implemented on the same computing device or on different computing devices.

All or a portion of the examples may be implemented as a computer program product 78 stored on a transitory or non-transitory computer-usable or computer-readable storage medium, such as the storage device 76, which includes complex programming instructions, such as complex computer-readable program code, to cause the processor device 64 to carry out the steps described herein. Thus, the computer-readable program code can comprise software instructions for implementing the functionality of the examples described herein when executed on the processor device 64.

The computing device 62 may also include a communications interface 80 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a computing device comprising a processor device, a first request directed to a load balancer to load balance subsequent requests based on a first request selection instruction;
   selecting a first particular load balancer driver from a plurality of load balancer drivers based on a load balancer table that correlates request selection instructions to corresponding load balancer drivers of the plurality of load balancer drivers based on different capabilities of the load balancer drivers, each load balancer driver being configured to load balance requests among a plurality of computing devices that are configured to service the requests; and
   causing the subsequent requests that are encompassed by the first request selection instruction directed to the load balancer to be load balanced by the first particular load balancer driver.

2. The method of claim 1 wherein causing the subsequent requests that are encompassed by the first request selection instruction directed to the load balancer to be load balanced by the first particular load balancer driver comprises:
   initiating the first particular load balancer driver; and
   initiating a first listener task that is configured to examine requests directed to the load balancer and send those requests that are encompassed by the first request selection instruction to the first particular load balancer driver.

3. The method of claim 1 further comprising:
receiving, by the computing device, a second request directed to the load balancer to load balance requests based on a second request selection instruction;
selecting a second particular load balancer driver from the plurality of load balancer drivers based on the load balancer table;
initiating the second particular load balancer driver; and
initiating a second listener task that is configured to examine requests directed to the load balancer and send those requests that are encompassed by the second request selection instruction to the second particular load balancer driver concurrently while the requests encompassed by the first request selection instruction directed to the load balancer are load balanced by the first particular load balancer driver.

4. The method of claim 1 wherein the first request selection instruction comprises instructions to load balance requests sent to a particular port.

5. The method of claim 1 wherein the first request selection instruction comprises instructions to load balance requests that utilize a particular protocol.

6. The method of claim 1 wherein the first request selection instruction comprises instructions to load balance requests based on content of a particular open systems interconnection (OSI) layer.

7. The method of claim 1 further comprising:
receiving, from the first particular load balancer driver, first selection information that identifies a load balancing capability of the first particular load balancer driver.

8. The method of claim 7 further comprising:
based on the load balancing capability of the first particular load balancer driver, generating a first table entry in the load balancer table that correlates first request selection instructions to the first load balancer driver based on the load balancing capability of the first particular load balancer driver.

9. The method of claim 8 further comprising:
receiving, from a second particular load balancer driver, second selection information that identifies a load balancing capability of the second particular load balancer driver; and
based on the load balancing capability of the second particular load balancer driver, generating a second table entry in the load balancer table that correlates second request selection instructions to the second particular load balancer driver based on the load balancing capability of the second particular load balancer driver.

10. A system comprising:
one or more computing devices, each computing device comprising:
a memory; and
a processor device coupled to the memory;
the one or more computing devices to:
receive a first request directed to a load balancer to load balance subsequent requests based on a first request selection instruction;
select a first particular load balancer driver from a plurality of load balancer drivers based on a load balancer table that correlates request selection instructions to corresponding load balancer drivers of the plurality of load balancer drivers based on different capabilities of the load balancer drivers, each load balancer driver being configured to load balance requests among a plurality of computing devices that are configured to service the requests; and
cause the subsequent requests that are encompassed by the first request selection instruction directed to the load balancer to be load balanced by the first particular load balancer driver.

11. The system of claim 10 wherein to cause the subsequent requests that are encompassed by the first request selection instruction directed to the load balancer to be load balanced by the first particular load balancer driver, the one or more computing devices are further to:
initiate the first particular load balancer driver; and
initiate a first listener task that is configured to examine requests directed to the load balancer and send those requests that are encompassed by the first request selection instruction to the first particular load balancer driver.

12. The system of claim 10 wherein the one or more computing devices are further to:
receive a second request directed to the load balancer to load balance requests based on a second request selection instruction;
select a second particular load balancer driver from the plurality of load balancer drivers based on the load balancer table;
initiate the second particular load balancer driver; and
initiate a second listener task that is configured to examine requests directed to the load balancer and send those requests that are encompassed by the second request selection instruction to the second particular load balancer driver concurrently while the requests encompassed by the first request selection instruction directed to the load balancer are load balanced by the first particular load balancer driver.

13. The system of claim 10 wherein the one or more computing devices are further to:
receive, from the first particular load balancer driver, first selection information that identifies a load balancing capability of the first particular load balancer driver.

14. The system of claim 13 wherein the one or more computing devices are further to:
based on the load balancing capability of the first particular load balancer driver, generate a first table entry in the load balancer table that correlates first request selection instructions to the first load balancer driver based on the load balancing capability of the first particular load balancer driver.

15. The system of claim 14 wherein the one or more computing devices are further to:
receive, from a second particular load balancer driver, second selection information that identifies a load balancing capability of the second particular load balancer driver; and
based on the load balancing capability of the second particular load balancer driver, generate a second table entry in the load balancer table that correlates second request selection instructions to the second particular load balancer driver based on the load balancing capability of the second particular load balancer driver.

16. A computer program product stored on a non-transitory computer-readable storage medium and including instructions configured to cause one or more processor devices to:
receive a first request directed to a load balancer to load balance subsequent requests based on a first request selection instruction;

select a first particular load balancer driver from a plurality of load balancer drivers based on a load balancer table that correlates request selection instructions to corresponding load balancer drivers of the plurality of load balancer drivers based on different capabilities of the load balancer drivers, each load balancer driver being configured to load balance requests among a plurality of computing devices that are configured to service the requests; and cause the subsequent requests that are encompassed by the first request selection instruction directed to the load balancer to be load balanced by the first particular load balancer driver.

17. The computer program product of claim 16 wherein to cause the subsequent requests that are encompassed by the first request selection instruction directed to the load balancer to be load balanced by the first particular load balancer driver, the one or more processor devices are further to:

initiate the first particular load balancer driver; and initiate a first listener task that is configured to examine requests directed to the load balancer and send those requests that are encompassed by the first request selection instruction to the first particular load balancer driver.

18. The computer program product of claim 16 wherein the one or more processor devices are further to:

receive a second request directed to the load balancer to load balance requests based on a second request selection instruction;

select a second particular load balancer driver from the plurality of load balancer drivers based on the load balancer table;

initiate the second particular load balancer driver; and initiate a second listener task that is configured to examine requests directed to the load balancer and send those requests that are encompassed by the second request selection instruction to the second particular load balancer driver concurrently while the requests encompassed by the first request selection instruction directed to the load balancer are load balanced by the first particular load balancer driver.

19. The computer program product of claim 16 wherein the one or more processor devices are further to:

receive, from the first particular load balancer driver, first selection information that identifies a load balancing capability of the first particular load balancer driver.

20. The computer program product of claim 19 wherein the one or more processor devices are further to:

based on the load balancing capability of the first particular load balancer driver, generate a first table entry in the load balancer table that correlates first request selection instructions to the first load balancer driver based on the load balancing capability of the first particular load balancer driver.

* * * * *